G. A. BETULANDER & N. G. PALMGREN.
AUTOMATIC TELEPHONE EXCHANGE SYSTEM.
APPLICATION FILED DEC. 20, 1913.

1,162,556.

Patented Nov. 30, 1915.
4 SHEETS—SHEET 1.

Witnesses:-
Henry L. Thieme.
Hyperion Barry

Inventors:
Gotthilf Ansgarius Betulander
and
Nils Gunnar Palmgren
by their attorney

Fig. 5

UNITED STATES PATENT OFFICE.

GOTTHILF ANSGARIUS BETULANDER, OF SÖDERTÖRNS VILLASTAD, AND NILS GUNNAR PALMGREN, OF STOCKHOLM, SWEDEN, ASSIGNORS, BY DIRECT AND MESNE ASSIGNMENTS, TO THE BETULANDER AUTOMATIC TELEPHONE COMPANY, LIMITED, OF LONDON, ENGLAND.

AUTOMATIC TELEPHONE-EXCHANGE SYSTEM.

1,162,556. Specification of Letters Patent. Patented Nov. 30, 1915.

Application filed December 20, 1913. Serial No. 807,925.

*To all whom it may concern:*

Be it known that we, GOTTHILF ANSGARIUS BETULANDER, a subject of the King of Sweden, and resident of Villa Castor, Södertörns Villastad, in the Kingdom of Sweden, and NILS GUNNAR PALMGREN, a subject of the King of Sweden, and resident of 35 Tjärhofsgatan, Stockholm, in the Kingdom of Sweden, have invented certain new and useful Improvements in or Relating to Automatic Telephone - Exchange Systems, of which the following is a specification, reference being had therein to the accompanying drawings.

One has tried to simplify automatic telephone exchanges and to increase their security of service by using selectors having shifting movement in one direction only, such selectors being in mechanical as well as electrical respect considerably simpler than the usual selectors with shifting movement in two directions (for instance the Strowger selectors). Also such systems have been proposed in which the interconnections are established by means of relays only. However, the systems of said kinds heretofore known have the disadvantage that the number of selectors or relays respectively is relatively large, which fact reduces to some extent the worth of those advantages gained by the greater simplicity of the connecting means.

The present invention has chiefly for its object to reduce the number of connecting elements necessary in such systems. According to this invention the said object is attained by a particular arrangement of the junction lines at the central exchange and by a corresponding arrangement of the connecting means used for effecting the interconnections.

The invention consists in providing intermediate lines between a group of incoming lines and the appertaining outgoing lines of the same group-selecting stage, said intermediate lines having at their disposal different lines of each numerical group of outgoing lines. The outgoing lines are thereby in respect of their accessibility distributed among a number of intermediate lines. As, however, all the intermediate lines are accessible to the incoming lines every one of the latter has a possibility of being connected with any one of the outgoing lines pertaining to the group of incoming lines in question. In such a line arrangement the selecting operation is effected separately the selecting of the group wanted and an available line of that group being effected before an intermediate line and its connecting means are taken into engagement. In addition to a great reduction of the number of connecting elements a considerable simplification of the wiring is attained inasmuch as the number of multiple-contacts is reduced, as will be explained more closely in the following specification.

Some forms of the invention are illustrated by way of example in the accompanying drawings in which—

Figure 1:
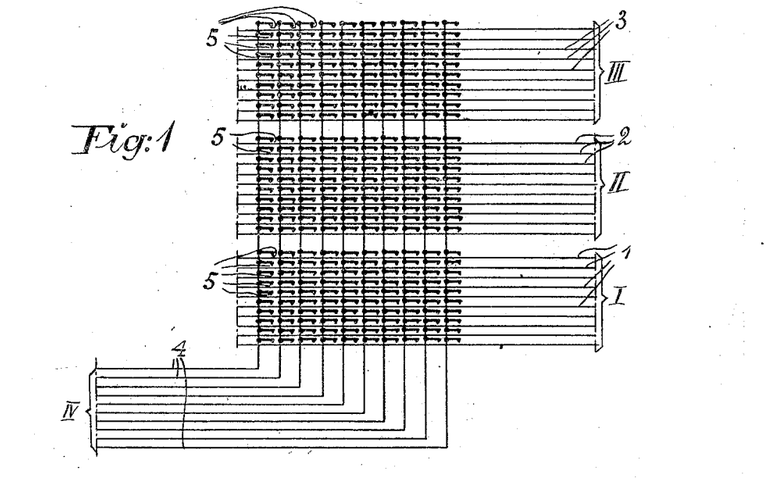
Figure 1 is a comparative representation of line arrangement according to the known Strowger system.

The principal feature of the invention may at first be explained with reference to Figs. 1 and 2. In Fig. 1 is shown a line group IV the several lines 4 of which are adapted to be connected with any one of the lines 1, 2, 3 of a number of (in practical cases usually ten) line groups I, II, III. This condition may be designated, independent of the nature of the means used for effecting the connections, in the manner shown in the drawing, by normally open contacts 5 adapted to be operated by the connecting means. In the well-known Strowger system this is effected by each line 4 being connected to the movable wipers of a group-selector or line-selector respectively the contact fields of which contain the terminal contacts of the lines 1, 2, 3 the different horizontal contact rows of said fields then corresponding to the different line groups I, II, III.

Figure 2:
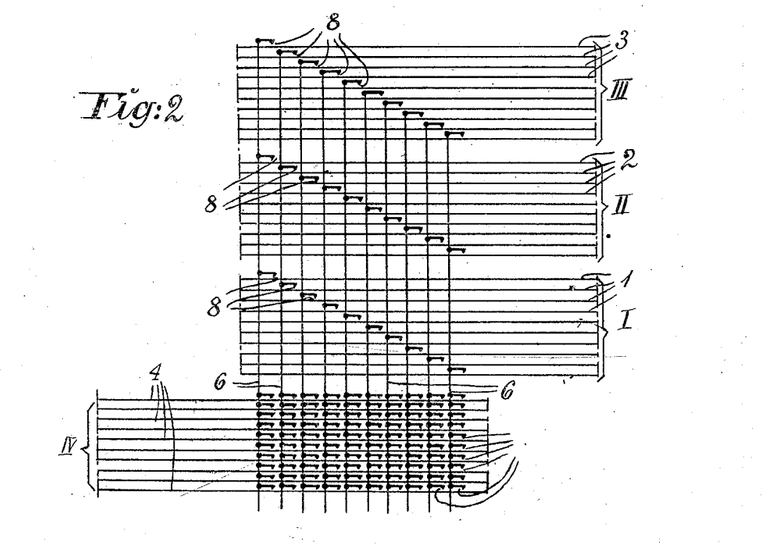
Fig. 2 is a corresponding arrangement according to the present invention.

Referring now to Fig. 2 it will be seen that, according to the present invention, intermediate lines 6 are provided between the incoming lines 4 and the outgoing lines 1, 2, 3 each of said intermediate lines being adapted to be connected at one side with any calling line 4 through contacts 7, at the other side with a line 1, 2 or 3 of any wanted group I, II or III respectively through contacts 8 the arrangement being further characterized by different intermediate lines having at their disposal different lines 1, 2 or 3 in each group I, II or III respectively. In such an arrangement an intermediate line must, evidently, be marked as engaged not only when it is engaged itself but also when the appertaining outgoing line of the group wanted is engaged. This is rendered possible according to this invention by first effecting the selecting operation, thereby determining the intermediate line to be used and then separately effecting the connection at both sides of the intermediate line selected. The connections may for instance be effected by means of selectors allotted individually to the several incoming lines 4 and to the several intermediate lines, the selectors allotted to the lines 4 then effecting the connections between the incoming lines 4 and the intermediate lines 6 and the selectors allotted to the intermediate lines effecting the connections between the intermediate lines 6 and the outgoing lines 1, 2, 3. The connections may also be effected by means of relays each contact 7 and 8 being then operated by a relay. The selecting and starting of the different selectors or the energizing of the different relays respectively is effected for instance by means of a group-selector common to all incoming lines 4, which selector upon a call is connected automatically to the calling line and then operates in response to the shifting impulses to select the desired group I, II or III. The operating circuits of the selectors or relays respectively are controlled by a testing device which, after the group-selector has been shifted, is connected with the test wires of all the lines of the group selected said testing device thereby affecting the operating circuits in such a manner that only the connecting elements corresponding to an accessible line of the group selected are operated to establish the connection, as will be fully explained below.

It will be seen, when comparing Figs. 1 and 2, that the number of contacts (5 or 7, 8 respectively) necessary for the connections between the line groups I, II, III and IV is less in the arrangement of Fig. 2 than in the corresponding arrangement of Fig. 1, and that is the principal advantage of the present invention inasmuch as for instance two selectors each adapted for ten lines and having single shifting movement may be substituted for one selector with a capacity of one hundred lines and having double shifting movement. Furthermore, only by this arrangement of the intermediate lines it has been possible, in such systems where the connections are effected by means of relays only, to reduce the number of relays in such a degree as to make systems of that kind practicable. By the reduction of the number of contacts the wiring is, evidently, simultaneously simplified.

The invention is, evidently, not restricted to the arrangement shown in Fig. 2 where there are as many intermediate lines as the number of lines of each group I, II, III and IV. For instance, the number of the intermediate lines may, if desired, be increased whereby one and the same outgoing line will be assigned to two or more intermediate lines and, further, each intermediate line may have at its disposal a plural number of lines in each group, so that for instance the first and second lines of each group I, II and III are assigned to the first intermediate line, the second and third line of each group to the second intermediate line, and so on.

Figure 3:
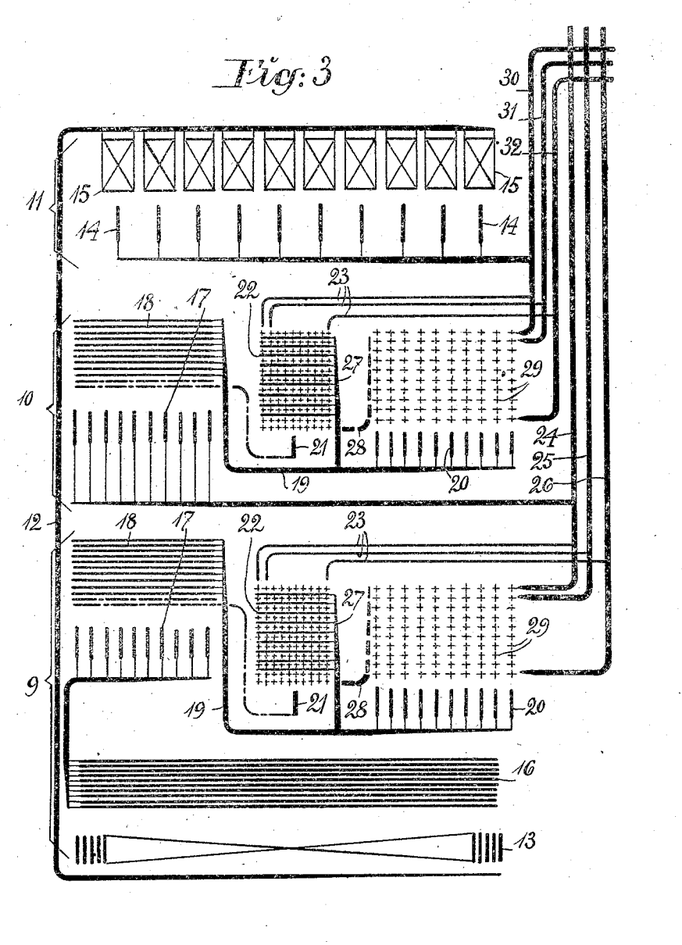
Figs. 3 and 4 show schematically two different forms of the invention when using selectors to effect the connections.

Fig. 3 shows schematically the most important parts of a selector frame of an exchange for 10000 subscribers. The exchange comprises 100 frames of that kind arranged in 10 parallel rows. Each frame supports substantially three separate groups of selectors, 9, 10, 11, the first, 9, used for effecting connections with the desired thousands group of subscribers' lines, the second, 10, used for effecting connections with the desired hundreds group and the third, 11, used for effecting the final connection with the desired subscriber's line. The hundred subscribers' lines entering into each frame are connected in usual manner through a cable 12 partly to pre-selectors 13, partly to the contact fields 15 of the line selectors 14. The pre-selectors 13 are adapted to select an idle primary connecting selector 17 among ten such selectors pertaining to the first selector group 9 said primary selectors 17 being connected to a common contact field 16 consisting of transversal contact wires. The primary connecting selectors 17 are adapted to select an accessible secondary connecting selector 20 said secondary selectors being connected to the contact field 18 of the primary selectors through intermediate lines 19. In the present instance ten secondary selectors are shown but their number may be varied in correspondence to different traffic conditions. Two group-selectors 21 are connected to the two first contact wires of the contact field 18 only one of these selectors being represented. The number of the group-selectors may be suited to the maximum number of simultaneously existing calls. The group-selector has eleven contact actuating arms provided one above the other on a rotatable, vertical shaft and operating in the corresponding horizontal rows of contacts of the contact field 22. The contacts of this field are connected to the test wires 23 of the junction lines 24, 25—26 extending to the different thousands groups, in such a manner that the test wires of the ten junction lines 24 of the first thousands group enter into the first vertical row of contacts, the test wires of the ten junction lines 25 of the second thousands group into the second vertical contact row of the contact field 22 and so on. Contact plates are inserted between the several horizontal rows of contacts said contact plates being connected through wires 27 to ten corresponding relays (not shown) allotted to the different secondary selectors 20. The contacts of the undermost horizontal row of the contact field 22 are connected to marking contacts in the contact fields 29 of the selectors 20 said fields 29 also containing the terminal contacts of the junction lines 24, 25—26. Each secondary selector 20 has at its disposal one junction line of each group 24, 25—26. The junction lines 24 are each connected with a primary connecting selector 17 of a second selector group 10 on the same frame, which belongs to the first thousands group, and the junction lines 25 are each connected with a primary connecting selector 17 of the second selector group 10 in a frame belonging to the second thousands group, and so on. The selector group 10 is similar to the group 9 except that the pre-selectors 13 and the contact field 16 are omitted. The junction lines 30, 31—32 coming from the contact fields 29 of the second group 10 extend to different frames belonging to the first thousands group. The junction lines of the first group 30 are connected with ten corresponding line selectors 14 on the first frame, which belongs to the first hundreds group, and the junction lines of the second group 31 are connected with ten corresponding line selectors on the frame belonging to the second hundreds group, and so on.

The connecting operation is performed substantially in the following manner. For the sake of simplicity it may be presumed that connection with a subscriber's line within the same hundreds group is desired the whole connecting operation then taking place within the same frame. Upon taking off the receiver at the substation the corresponding pre-selector 13 is started to connect the calling subscriber's line with an idle primary selector 17. The latter is then immediately operated to effect connection with an idle first group-selector 21 the shaft of which is now rotated for instance one step if the subscriber wanted belongs to the first thousands group. The group-selector causes a secondary selector 20 at the time available to operate, said selector connecting the corresponding intermediate line 19 to that one of the junction lines, allotted to this selector, which belongs to the first group 24 this line having been marked by the group selector by actuating the corresponding undermost contact of its contact field. The selecting of an idle secondary selector, having at its disposal an idle junction line of the group selected, is effected by means of the above-mentioned relays allotted to the secondary selectors which relays control the starting circuits of the secondary selectors. Said relays are operated by the group selector to cut off those secondary selectors the junction lines of which, belonging to the group in question, are already engaged, so that only the first one of the available secondary selectors may be started. If for instance the three first secondary selectors 20 are engaged and the two next selectors can not be used, their corresponding junction lines of the group in question being engaged in other frames, while the fifth selector and its corresponding junction line are free, only this fifth selector is started all other selectors remaining inactive. At the same time as this selector is started or immediately after the shifting of the selector has been finished the same primary selector 17 that just has selected the group selector, is again operated thereby proceeding its movement in the same direction to find the intermediate line 19 corresponding to the secondary selector 20 just operated. By this operation connection is effected with one of the junction lines of the first group 24 and thus with a corresponding primary selector 17 of the selector group 10. The selector last mentioned now operates in the manner described, at first to select an idle second group-selector 21 and then to connect the incoming junction line with a secondary selector 20 in the meantime selected and shifted through the coöperation of the group-selector and the relays whereby connection is effected with a line selector 14 of the same frame. This selector, which suitably has shifting movement in two directions, has at its disposal all the subscribers' lines connected to this frame and is now operated to complete the connection with the wanted subscriber's line.

In full automatic systems the pre-selectors 13 may, if wanted, themselves constitute the primary connecting selectors 17 of the first selector group 9 the contact field 16 being then omitted. In semi-automatic systems, however, the arrangement shown in Fig. 3 may advantageously be used the pre-selectors 13 then simultaneously serving to select a disengaged operator.

Figure 4:
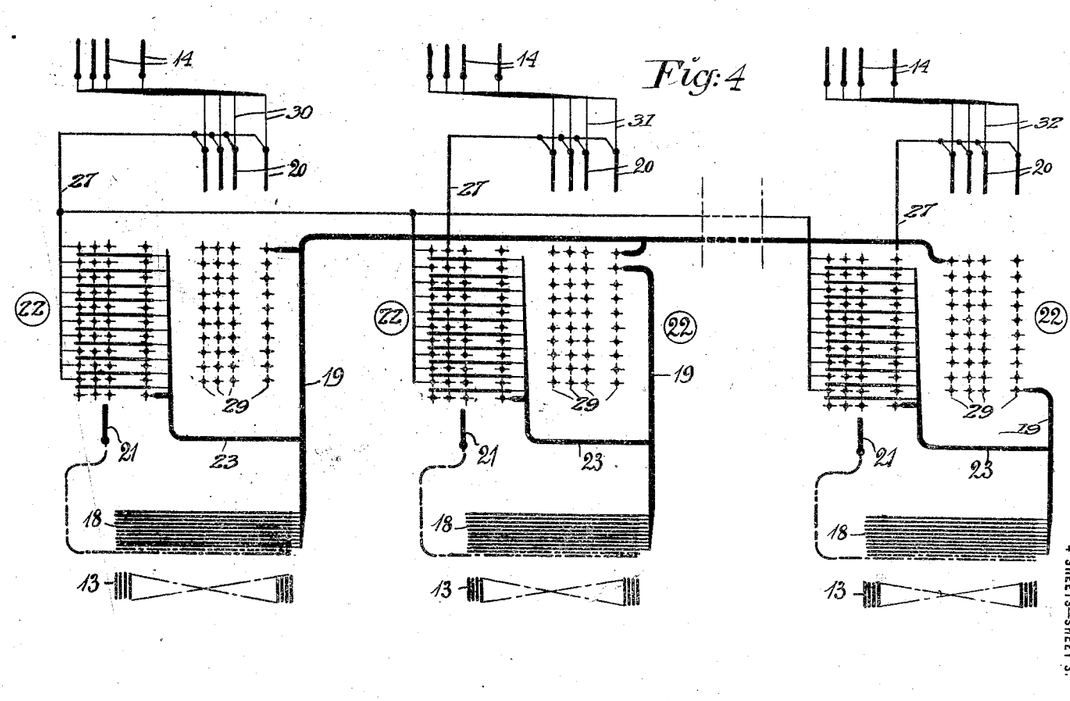

Fig. 4 shows schematically another form of the invention as applied to an installation for 1000 subscribers. The exchange comprises ten selector frames three of which being shown in the drawing. Only those selectors corresponding to the groups 10 and 11 of Fig. 3 are provided on each frame the pre-selectors 13 of Fig. 4 constituting the primary connecting selectors 17 of Fig. 3.

The essential difference between the arrangements according to Fig. 3 and Fig. 4 consists in that the secondary selectors 20 of Fig. 4 are connected to the junction lines 30, 31—32, while the intermediate lines 19 are connected at the corresponding end to the contact fields 29 in such a manner that the ten intermediate lines 19 of the first frame are connected to the different first sets of contacts (the uppermost horizontal row of contacts) of the first frame, the intermediate lines of the second frame connected to the different second sets of contacts of the second frame, and so on, the corresponding contact fields 29 of the different frames being connected in multiple. Further, the relay wires 27 are connected to the vertical rows of the group-selector contact fields, while the contact plates provided between the different horizontal rows are connected to the test wires 23 of the intermediate lines 19 extending from the same frame. Only four of the secondary selectors 20 are shown in the drawing though in fact there are ten or more such selectors.

The connecting operation is the same as described with reference to Fig. 3, a preselector 13 of the first frame for instance upon a call at first selecting an idle group-selector 21 the shaft of which is then rotated two steps, if for instance connection with a subscriber's line belonging to the second frame is to be established. Upon actuating the corresponding contacts of the group-selector field the test wires 23 of the intermediate lines 19 belonging to the first frame are connected through wires 27 to the relays allotted to the secondary selectors 20 of the second frame. By the action of these relays the first available secondary selector 20 of the second frame is now started. The corresponding undermost contact of the group-selector field simultaneously effects such a marking in the contact field of the secondary selector in question that the latter is stopped at the first set of contacts thus establishing connection with the corresponding intermediate line 19 extending to the first frame. Immediately after the preselector 13 again operates to find the intermediate line just mentioned whereby connection with one of the junction lines 31 and through that one with a line selector 14 is attained this line selector then operating to complete the connection with the wanted subscriber's line.

As may be seen from Figs. 3 and 4 it is immaterial whether the secondary selectors 20 are connected to the junction lines or to the intermediate lines. The primary selectors 17 may likewise be connected either to the junction lines (or subscriber's lines respectively) or to the intermediate lines. In the last instance the junction lines or the subscriber's lines respectively terminate in contact fields in which the primary selectors may hunt out the calling line. Further, it is immaterial in which order the primary and secondary selectors may be started since after selection of an idle intermediate line corresponding to an idle junction line of the group in question the primary and secondary selectors to be used are definitively determined and therefore the two connecting selectors may be started either simultaneously or successively. The manner in which the group-selector is connected to the calling line is likewise of a subordinate importance. For instance a searcher may be assigned to each group-selector said searcher hunting out the calling line and connecting the group-selector to the same.

Figure 5:
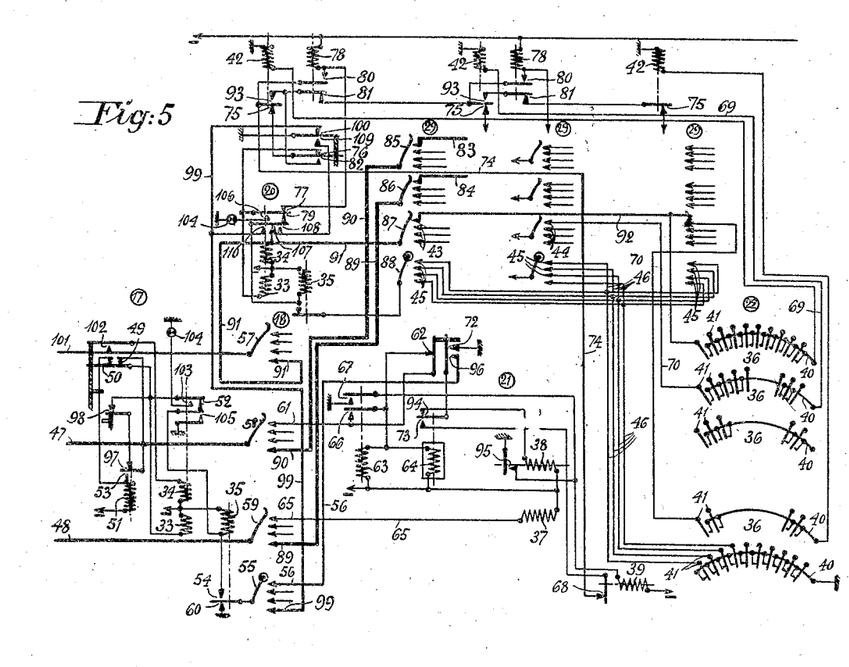
Fig. 5 is a diagram of circuits corresponding to the general scheme of Fig. 3.

Fig. 5 illustrates the circuit arrangements for effecting connections in one connecting section, for instance 10 of Fig. 3. The primary selectors 17 and the secondary selectors 20 are of the type described in the patent application No. 754273 (filed March 14, 1913). They are provided with three electro-magnets, viz., a main magnet 33, an auxiliary magnet 34 and a tilt magnet 35. The shifting operation is effected by the magnets 33 and 35 being energized thereby releasing the member supporting the contact wipers of the selector. Said member, upon being released, drops and continues its descendent movement until the private wiper finds an idle junction line the magnets 33 and 35 being then deprived of current so that the supporting member is stopped in the corresponding position. During the movement the line wipers are kept out of contact with the contact field by the tilt magnet 35. The restoring of the selector to normal position is effected by sending intermittent current through the main magnet 33 while the magnets 34 and 35 are energized continuously.

The shifting member of the group-selector 21 consists, as stated above, of a vertical, rotatable shaft supporting eleven horizontally projecting arms arranged one above the other and each operating in a corresponding row of contacts 36 of the contact field 22. The shaft is rotated step-by-step in any known manner by means of an electro-magnet 37 and is restored by means of an electro-magnet 38. During the shifting and restoring operations the arms are kept out of contact with the corresponding rows of contacts by means of an electro-magnet 39 the latter upon energizing raising the shaft and its arms. Each row of contacts comprises a contact plate 40 and ten contact springs 41 mounted with interposed insulation on the said plate. As the magnet 39, after the selector has been shifted, is deenergized for a moment the shaft is depressed the projecting arms then actuating the corresponding contact springs 41, so that the ten upper springs make contact with the subjacent contact plates 40 while the undermost one opens the corresponding contact. However, in order to make the circuits plain the contacts are drawn in such a manner as if the making and breaking of the contacts were effected in horizontal direction. The contact plates 40 are connected to earth, the undermost one directly and the other through relays 42 allotted to the different secondary selectors 20. The contact springs 41 of the uppermost row are connected to the corresponding test wires 43 of the outgoing junction lines terminating in the contact field 29 of the shown first secondary selector 20, the contact springs of the subjacent row to the test wires 44 of the outgoing junction lines assigned to the second secondary selector, and so on. The contact springs 41 of the undermost contact row are connected through wires 46 to the marking contacts 45 of the secondary selectors said marking contacts being connected in multiple within the same frame. In this instance three group-selectors are supposed to be assigned to each group of ten primary selectors. The battery, the positive pole of which is connected to earth, is not illustrated. Instead of it pole designations (earth and minus) are placed at the ends of the wires. The current transmission necessary for effecting a connection in a connecting section, is such that at first both line branches are connected to earth and then a contact in one branch is opened and closed repeatedly. Thus, immediately after the calling subscriber has connected his line to a line 47, 48 leading to a primary selector 17 a circuit is closed extending from earth at the line branch 47 through this line branch, the carrier operated contact 49 of the selector 17 and further partly through the contact 50 and a relay 51, partly through the main magnet 33 and partly through the contact 52 operated by the auxiliary magnet 34 and the tilt magnet 35 to the battery. Upon the closure of this circuit the primary selector 17 is started. The relay 51, upon energizing, puts itself into a locking circuit through the contact 53 and remains thus energized even after the wiper carrier has left its normal position and opened the contacts 49 and 50. The tilt magnet 35 closes the contact 54 thereby connecting itself to the private wiper 55 through the contact 52 of the auxiliary magnet 33.

As long as the primary selector 17 is hunting for an idle group-selector 21 the flow of current through the magnets 33 and 35 is maintained through the private wiper 55 and the earthed test wires 56 of the engaged group-selectors. In this instance it may be supposed that the first group-selector is free. Accordingly, as the private wiper 55 reaches the corresponding test contact it does not find an earthed contact, and consequently the magnets 33 and 35 are deprived of current upon the opening of the contact 49. The wiper carrier is thus stopped and the wipers 57, 58 and 59 are brought into engagement with the corresponding contacts of the contact field 18. The private wiper 55 is simultaneously connected to earth through the contact 60 the group-selector being in this way marked as engaged.

As the wipers 58 and 59 engage the contact field two circuits are closed, one extending from the earth at the line branch 47 through the wiper 58, wire 61, a shaft operated contact 62 closed in the normal position of the group-selector, and further parallelly through two relays 63 and 64 to the battery, the other extending from earth at the line branch 48 through wiper 59, wire 65 and the shifting magnet 37 of the group-selector to the battery. Although said magnet 37 attracts its armature upon the closure of the circuit last mentioned yet the shaft of the group-selector is not rotated until the magnet releases its armature. The relay 63, upon energizing, cuts itself and thereby the slow acting relay 64 into a locking circuit through the contact 66 and the lifting magnet 39 into a circuit through the contact 67.

It may be assumed that a connection in the first line group is desired. Accordingly the current flowing in the line branch 48 is now interrupted while the line branch 47 is maintained current carrying. The shifting magnet 37 of the group-selector thereby deënergizes so that the shaft of the selector is rotated one step. Immediately after the circuit extending over the line branch 47 is also broken so that the relays 63 and 64 are deprived of current the relay 63 thereby instantly releasing its armature, while the slow acting relay 64 for a short time keeps its armature in attracted position. Consequently, the lifting magnet 39 is deënergized thereby causing the group-selector arms to operate the corresponding contact springs 41 and close a contact 68. In closing the contacts 40, 41 all the ten junction lines of the first group are tested. Should any one of these junction lines, for instance the second, be engaged a circuit is closed from earth through the relay 42 at the second secondary selector, wire 69, contact 40, 41 of the second row of contacts, wire 70, the corresponding test wire 44 and further through the auxiliary magnet 34 of the secondary selector 20 corresponding to the junction line in question to the battery. The relay 42 energizes upon the closure of this circuit thereby opening the contact 75 and cutting off the corresponding secondary selector, as will be fully explained below. In this instance it may be supposed that the first junction line as well as the first secondary selector 10 are disengaged. The corresponding test wire 43 is then disconnected from the battery and, consequently, the relay 42 at the first selector 10 remains deenergized. Thus, a circuit is closed extending from earth through the contact 72, contact 73 of relay 64, contact 68, wire 74, contact 75 of relay 42, contact 76 and further parallelly partly through the main magnet 33, partly through a contact 77 operated by the auxiliary magnet 34 and a relay 78 and partly through the contact 79 and the tilt magnet 35 to the battery. The selector 20 is started upon the closure of this circuit, and simultaneously the relay 78 attracts its armature thereby putting itself into a locking circuit through the contact 80 and opening a contact 81 for the purpose of preventing the starting current, after having started the selector 20, from passing through the contact 82, which is closed as the selector leaves its normal position, and through the contact 81 to the next idle selector, which then would be started too. The started selector 20 now hunts for that junction line the marking contact 45 of which has been disconnected from earth by the group-selector, thus, in this instance the first junction line 83, 84. During the shifting movement the wipers 85, 86 and 87 are kept out of engagement with the contact field while the private wiper 88 always engages the contact field. Since now the first test contact 45 is disengaged from earth the magnets 33 and 35 are deënergized even upon opening the contact 76. The contact wipers are thereby stopped in the first contact position and the corresponding intermediate line 89, 90 is connected to the junction line 83, 84 and the restoring wire 91 to the corresponding wire 92. If, on the other hand, the first secondary selector 20 has been engaged, the starting current would have passed through the contacts 82 and 81 to the next selector. If the latter is then disengaged but its corresponding junction line is engaged the starting current will pass on through the contacts 93 and 81, and so on. Immediately after the shifting of the first secondary selector 20 the relay 64 releases its armature the locking circuit of the relay 78 being thereby broken at the contact 73. The restoring magnet 38 of the group-selector simultaneously receives current through the contacts 72 and 94. This magnet thereby cuts in the lifting magnet 39 at the contact 95 and releases the shaft of the group-selector so that this one will be restored to normal position by the action of a spring. During the restoring movement the group-selector is marked as engaged by its test wire 56 being connected to earth through the contacts 96 and 72. The latter are opened in the initial position the magnets 38 and 39 being thereby cut out of circuit.

The second connecting period is started by both line branches 47 and 48 being again connected to earth. A circuit is thereby closed extending from earth through line branch 47, contact 97 of relay 51, contact 98 and further parallelly partly through the magnet 33, partly through the contact 52 and the magnet 35 of the primary selector 17 to the battery. Upon the closure of this circuit the selector 17 is started for the second time the said circuit, as long as the wipers are moving through the three contact positions pertaining to the group-selectors, being maintained through the contact 98 which is adapted to be opened when the wipers reach the contact position of the first intermediate line. Since the test wire 99 of this intermediate line has been disconnected from earth at the contact 100 by the shifting of the corresponding secondary selector, 20 the primary selector is stopped in the corresponding contact position. Hereby the connection is prolongated to a line selector or to a primary selector of the next connecting section respectively. If, however, the primary selector had to hunt for instance for the fifth intermediate line, the flow of current through the magnets 33 and 35 of that selector would be maintained through the private wiper 55 and the test wires 99 of the four first intermediate lines as these test wires then would be connected to earth either through the contact 100 of the corresponding secondary selector or through the private wiper 55 and the contact 60 of another primary selector connected to the corresponding intermediate line.

The restoring of the selectors is effected by one or the other subscriber by putting earth to the restoring wires 101, 91 and 92. The circuit of the magnet 34 of the primary selector is thereby closed through the contact 102 actuated by the wiper carrier. Said magnet, upon energizing, puts the magnet 33 in a circuit containing the contact 103 and an interrupter 104. Further, the circuit of the tilt magnet 35 is closed at the contact 105. Consequently, the primary selector 17 is restored to normal position in which the restoring circuit is broken at the contact 102. The secondary selector 20 is restored in a similar manner the magnet 34, upon operating, putting the main magnet 33 into a circuit including the contact 106 and the interrupter 104 and simultaneously putting itself in a locking circuit through the contacts 107, 108 and 109. Further, the circuit of the tilt magnet 35 is closed through the contacts 108 and 109. Consequently, the secondary selector is restored to its normal position in which the restoring circuit is broken at the contact 109. During the restoring period the secondary selector is marked as engaged by its test wire 99 being connected to earth through the contact 110.

Having now described our invention, what we claim as new and desire to secure by Letters Patent is:

1. A telephone exchange system having in each group-switching section a plurality of numerical groups of outgoing lines, a number of incoming lines each adapted to be connected with anyone of the lines of said groups, intermediate junction lines provided between said incoming and outgoing lines and having at their disposal different lines of each numerical group, connecting means for effecting the connections at both ends of the intermediate lines and separate selecting means adapted to select the group wanted and an intermediate line available for the connection wanted.

2. A telephone exchange system having in each group-switching section a plurality of numerical groups of outgoing lines, a number of incoming lines each adapted to be connected with anyone of the lines of said groups, intermediate junction lines provided between said incoming and outgoing lines and having at their disposal different lines of each numerical group, connecting means individually allotted to the various lines and adapted to effect the connections at both ends of the intermediate lines and separate selecting means allotted in common to the incoming lines and adapted to select the group wanted and an intermediate line available for the connection wanted.

3. A telephone exchange system having in each group-switching section a plurality of numerical groups of outgoing lines, a number of incoming lines each adapted to be connected with anyone of the lines of said groups, intermediate junction lines provided between said incoming and outgoing lines and having at their disposal different lines of each numerical group, connecting means individually allotted to the incoming lines and adapted to effect the connections between the incoming lines and the intermediate lines, connecting means individually allotted to the intermediate lines and adapted to effect the connections between the intermediate lines and the outgoing lines and separate selecting means adapted to select the connecting means available for the connection wanted.

4. A telephone exchange system having in each group-switching section a plurality of numerical groups of outgoing lines, a number of incoming lines each adapted to be connected with anyone of the lines of said groups, intermediate junction lines provided between said incoming and outgoing lines and having at their disposal different lines of each numerical group, connecting means individually allotted to the incoming lines and adapted to effect the connections between the incoming lines and the intermediate lines, connecting means individually allotted to the outgoing lines and adapted to effect the connections between the intermediate lines and the outgoing lines and common selecting means adapted to select the connecting means available for the connection wanted.

5. A telephone exchange system having in each group-switching section a plurality of numerical groups of outgoing lines, a number of incoming lines each adapted to be connected with anyone of the lines of said groups, intermediate junction lines provided between said incoming and outgoing lines and having at their disposal different lines of each numerical group, a plurality of selectors common to the incoming lines, connecting means individually allotted to the incoming lines and means for operating said connecting means first to connect the appertaining incoming line with one of said selectors and then to effect the connection with the intermediate line to be used.

6. A telephone exchange system having in each group-switching section a plurality of numerical groups of outgoing lines, a number of incoming lines each adapted to be connected with anyone of the lines of said groups, intermediate lines provided between said incoming and outgoing lines and having at their disposal different lines of each numerical group, connecting means for effecting the connections at both ends of the intermediate lines, separate selecting means for selecting the group wanted, operating circuits for said connecting means and separate testing means controlling said circuits and adapted to select the connecting means available for the wanted connection.

In witness whereof, we have hereunto signed our names in the presence of two subscribing witnesses.

GOTTHILF ANSGARIUS BETULANDER.
NILS GUNNAR PALMGREN

Witnesses:
ROBERT APELGREN,
GRETA PRIEN.